United States Patent
Kino et al.

(10) Patent No.: US 9,119,410 B2
(45) Date of Patent: Sep. 1, 2015

(54) FILLED, BAKED CRISPY SNACK HAVING A HIGH MOISTURE CONTENT

(75) Inventors: Alan John Kino, Waldwick, NJ (US); Lynn C. Haynes, Morris Plains, NJ (US); Jennette Neske, Branchburg, NJ (US); Desiree S. Derrick, Monmouth Junction, NJ (US); Theodore N. Janulis, Rendolph, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 1395 days.

(21) Appl. No.: 12/040,428

(22) Filed: Feb. 29, 2008

(65) Prior Publication Data

US 2009/0220654 A1 Sep. 3, 2009

(51) Int. Cl.
*A21D 13/00* (2006.01)
*A23G 3/54* (2006.01)
(Continued)

(52) U.S. Cl.
CPC .............. *A23L 1/0067* (2013.01); *A21D 2/186* (2013.01); *A21D 13/0022* (2013.01); *A23L 1/0522* (2013.01); *A23L 1/1645* (2013.01); *A23P 1/086* (2013.01); *A23V 2002/00* (2013.01)

(58) Field of Classification Search
CPC .............. A21D 2/186; A21D 13/0022; A21D 13/0019; A21D 13/0016; A21D 13/0012; A21D 13/0009; A21D 13/0006; A21D 13/0003; A21D 13/00; A23L 1/0067; A23L 1/0522; A23L 1/0044; A23L 1/0014; A23L 1/00; A23L 1/052; A23L 1/05; A23P 1/0086; A23P 1/1645; A23P 1/086; A23P 1/08; A23P 1/00; A23V 2250/5118; A23V 2250/51; A23V 2250/50

USPC ................ 426/282, 94, 89, 275, 103, 93, 274
See application file for complete search history.

(56) References Cited

U.S. PATENT DOCUMENTS 580,834 A 4/1897 Wright
3,656,967 A * 4/1972 Barton et al. ................ 426/275
(Continued)

FOREIGN PATENT DOCUMENTS

EP 19950421509 2/1995
EP 1430789 6/2004
(Continued)

OTHER PUBLICATIONS

Sablani, et al. Food. Eng. Rev. 2 (2010) 168-203.*
(Continued)

*Primary Examiner* — D. Lawrence Tarazano
*Assistant Examiner* — Jerry W Anderson
(74) *Attorney, Agent, or Firm* — Greenblum & Bernstein, P.L.C.

(57) ABSTRACT

A shelf-stable, filled, baked crispy snack which possesses a crispy textured casing and a moist, soft textured filling over a prolonged period of time is obtained by formulating a casing which when baked has a high glass temperature (Tg) at a high moisture content. Increasing the degree of starch gelatinization to increase the Tg may be achieved during baking and by the addition of a pregelatinized starch. The high Tg baked casing permits the use of a high moisture content filler in high amounts to provide a shelf-stable substantial textural dichotomy in the filled, baked, crispy snack. The filled, baked snack exhibits an unexpectedly high resistance to deformation or peak force at high baked casing moisture contents. The baked snack is ready-to-eat out of the packaging and does not have to be toasted, microwaved or further baked, cooked, or heated for consumption, or to achieve a crisp textured casing.

27 Claims, 3 Drawing Sheets

(51) Int. Cl.
  *A23L 1/48* (2006.01)
  *A23L 1/00* (2006.01)
  *A21D 2/18* (2006.01)
  *A23L 1/0522* (2006.01)
  *A23L 1/164* (2006.01)
  *A23P 1/08* (2006.01)

(56) References Cited

U.S. PATENT DOCUMENTS

| | | | |
|---|---|---|---|
| 4,183,969 | A | 1/1980 | Rubens |
| 4,455,333 | A | 6/1984 | Hong et al. |
| 4,618,498 | A | 10/1986 | Thulin |
| 4,715,803 | A | 12/1987 | Koppa et al. |
| 4,748,031 | A | 5/1988 | Koppa et al. |
| 5,080,919 | A | 1/1992 | Finley et al. |
| 5,093,146 | A | 3/1992 | Calandro et al. |
| 5,145,699 | A | 9/1992 | Dijkshoorn et al. |
| 5,405,625 | A | 4/1995 | Biggs et al. |
| 5,429,834 | A | 7/1995 | Addesso et al. |
| 5,500,234 | A | 3/1996 | Russo |
| 5,523,106 | A | 6/1996 | Gimmler et al. |
| 5,723,164 | A | 3/1998 | Morano |
| 5,747,092 | A | 5/1998 | Carey et al. |
| 6,267,998 | B1 | 7/2001 | Bauman et al. |
| 6,827,958 | B2 | 12/2004 | Brown et al. |
| 2002/0015761 | A1* | 2/2002 | Prosise et al. ............ 426/72 |
| 2002/0039612 | A1 | 4/2002 | Gambino et al. |
| 2002/0068115 | A1 | 6/2002 | Hayes-Jacobson |
| 2003/0124227 | A1 | 7/2003 | Brown et al. |
| 2004/0047950 | A1 | 3/2004 | Gambino et al. |
| 2004/0047963 | A1* | 3/2004 | Haynes et al. ............ 426/549 |
| 2004/0121051 | A1 | 6/2004 | Fenn et al. |
| 2004/0185158 | A1 | 9/2004 | McHugh et al. |
| 2005/0025862 | A1 | 2/2005 | Morad et al. |
| 2005/0084567 | A1 | 4/2005 | Brown et al. |
| 2005/0249845 | A1 | 11/2005 | Mihalos et al. |
| 2006/0177556 | A1 | 8/2006 | Howery |
| 2009/0081335 | A1* | 3/2009 | Ortiz et al. ............ 426/94 |
| 2009/0110780 | A1* | 4/2009 | Sanchez et al. ............ 426/96 |
| 2010/0092612 | A1 | 4/2010 | Hansen et al. |

FOREIGN PATENT DOCUMENTS

| | | |
|---|---|---|
| EP | 20061209979 | 1/2006 |
| EP | 1 982 598 | 10/2008 |
| JP | 2001275585 | 10/2001 |
| JP | 2008140560 | 6/2008 |
| RU | 2274000 | 4/2006 |
| WO | 0110222 | 2/2001 |
| WO | 0132024 | 5/2001 |
| WO | 2005112664 | 12/2005 |

OTHER PUBLICATIONS

J. Kern Sears and Joseph R. Darby, "The Technology of Plasticizers," John Wiley & Sons, Inc., New York, 1982, pp. 1-34.

Jacqueline Amemiya and Juan A. Menjivar, "Mechanical Properties of Cereal Based Food Cellular Systems," American Association of Cereal Chemist, 77th Annual Meeting, Abstract 207, Sep. 20-23, 1992, Minneapolis, Minnesota.

Slade, Louise, and Levine, Harry, "Structural stability of intermediate moisture foods- a new understanding?"Food Structure-Its Creation and Evaluation, eds. J.M.V. Blanshard and J.R. Mitchell, Butterworths, London, pp. 115-147 (1989).

"A History of the Glassy State in Foods", ed. Blanshard & P.J. Lillford. Univ. Nottingham Press, Nottingham, UK, pp. 1-12 (1983).

Oct. 24, 2012 Decision of Granting a Patent for Invention in patent family member Russian application No. 2009107294 in Russian, with English Translation.

English Abstract of RU2274000, Apr. 20, 2006.

"Frontiers in Carbohydrate Research—1", Food Applications, ed. R.P. Millane, J.N. BeMiller and R. Chandrasekaran, Elsevier Applied Science, London, pp. 215-270, (1989).

"Water Relationships in Foods", eds. H. Levine and L. Slade, Plenum Press, New York, pp. 29-57 (1991).

"Physical Properties of Polymers", eds. J.E. Mark, A. Eisenberg, W.W. Graessley, L. Mandelkern and J.L. Koenig, American Chemical Society, Washington DC, pp. 97-153 (1984).

"Water in Polymers", Rowland, ACS Symp. Ser. 127, American Chemical Society, Washington DC (1980).

"Food Structure and Behaviour", eds. J.M.V. Blanshard and P. Lillford, Academic Press, London, pp. 149-176 (1987).

"The glass transition of amylopectin measured by DSC, DMTA and NMR," Kalichevsky et al., Carbohydr. Polym, vol. 18, pp. 77-88 (1992).

"Glass Transition of Bread," Cereal Foods World, vol. 37, pp. 264-267 (1992).

"Beyond Water Activity: Recent Advances Based on an Alternative Approach to the Assessment of Food Quality and Safety," Crit. Rev. Food Sci. Nutri, vol. 30, pp. 115-360 (1991).

Slade & Levine, Journal of Food Engineering, vol. 24 pp. 431-509 (1995).

"The Terminology and Methodology Associated With Basic Starch Phenomena", Atwell et al., Cereal Foods World, vol. 33, No. 3, pp. 306-311 (Mar. 1988).

Borde et al., J. Carbohydrate Polymers, vol. 48, pp. 83-86 (2002).

"Phase Transitions of Mixtures of Amorphous Food Components", Roos and Karel, Paper No. 7a, AIChE Summer Meeting, San Diego, Aug. 19-22, 1990.

Ash et al. "Handbook of green chemicals", [Online], p. 157, XP002531450, Endicott NY, USA, Retrieved from the Internet: URL:http://www.knovel.com/web/portal/browse/display? EXT_KNOVEL_DISPLAY_bookid=2267,2004, (2008).

Extended European Search Report for EP 09 15 3476 (Jun. 25, 2009).

* cited by examiner

FILLED, BAKED CRISPY SNACK HAVING A HIGH MOISTURE CONTENT

FIELD OF THE INVENTION

This invention relates to a shelf-stable filled, baked snack having a high moisture content soft filling, and a high moisture content casing which is crisp, such as a baked, fruit filled snack or filled fruit crisp. This invention also relates to methods for producing a shelf-stable filled, baked snack having a high moisture content soft filling, and a high moisture content casing which is crisp over an extended period of time.

BACKGROUND OF THE INVENTION

In the production of a filled snack having soft, moist filling, such as a fruit filling, using a high moisture content filling, the moisture migrates between, the filling and the casing until the water activity or relative humidity of the filling and casing are the same at equilibrium. Generally, it may take from several days to several months for equilibrium to be reached when the snack is packaged in moisture proof packaging. A baked good may be made crisp by baking to a low moisture content. For example, a toaster pastry or a piece of bread may be made crisp by toasting to a low moisture content. When moisture migrates from a high moisture content filling to a low moisture content casing, the casing texture may lose crispness and become soft and moist. In some snack products, such as FIG NEWTONS®, a moist soft filling and a moist soft baked casing are desirable. However, to produce a filled baked snack having a crisp casing and a soft moist filling, use of a high moisture content filling generally softens a crisp casing to the point where it is no longer crisp. To remedy this problem, the amount of high moisture filling may be substantially reduced or the snack product may be cooked, baked or toasted, like a toaster pastry product, to reduce the moisture content of the casing and develop crispness. However, reduction of the amount of a high moisture content filling or reducing the moisture content of a filling to increase crispness of the casing, detracts from the attainment of a soft, moist, lubricious mouthfeel or texture for the filling. Also, cooking or toasting of the product requires an extra step by the consumer, and the convenience of a ready-to-eat product is lost. Further heating of the product, such as by toasting or microwaving to reduce the moisture content of the casing may also substantially reduce the moisture content of the filling resulting in loss of a moist, soft mouthfeel for the filling. The heating may also cause undesirable escape or leakage of the filling from the casing, especially in a product having open ends with a visually apparent filling, such as a FIG NEWTON®.

Reduction of moisture migration by the use of a moisture barrier material is disclosed in U.S. Pat. Nos. 4,715,803 and 4,748,031 to Koppa. An extruder provides a triple coextruded product having an inner layer, which is surrounded, or enrobed, by an intermediate layer, which is surrounded, or enrobed, by a third outer-most layer. The inner layer is a dough having a chewy and moist texture when baked and the outer layer is a dough having a crispy texture after baking. A barrier material is injected between the two dough layers to achieve the desired product stability and shelf life. However this approach requires special extrusion equipment and introduces a barrier material into the formulation.

It is believed that as moisture migrates in increasing amounts to a baked casing, the glass transition temperature (Tg) of casing ingredients, such as starch, is increasingly reduced. As the glass transition temperature (Tg) is reduced, such as to below body temperature (e.g. 37° C.) or below room temperature, the ingredient melts or changes phase to impart a softer texture or mouthfeel with a loss of crispiness.

Glass transition can be defined as a physicochemical event or change of state that can govern product properties. See "A History of the Glassy State in Foods", ed. Blanshard & P. J. Lillford. Univ. Nottingham Press, Nottingham, UK, pp. 1-12 (1983). Glass-forming aqueous food polymers mediate the thermal, mechanical and structural properties of food. Plasticization by low molecular weight solvents like water modulates the temperature location of the glass transition of aqueous food polymers. See, Sears & Darby, *The Technology of Plasticizers*, Wiley-Interscience New York (1982); Slade & Levine, "Structural stability of intermediate moisture foods—a new understanding?;" *Food Structure-Its Creation and Evaluation*, eds. J. M. V. Blanshard and J. R. Mitchell, Butterworths, London, pp. 115-47, (1989); a food polymer science approach to selected aspects of starch gelatinization and retrogradation. In *Frontiers in Carbohydrate Research*-1: Food Applications, ed. R. P. Millane, J. N. BeMiller and R. Chandrasekaran, Elsevier Applied Science, London, pp. 215-70) it is disclosed that water depresses the Tg of completely amorphous or partially crystalline food products. As explained by Slade & Levine, structure-property relationships for food materials during processing and product storage are affected by thermal glass transition temperature Thermal glass transition defines the temperature above which a viscoelastic, rubbery liquid state of accelerated mobility exists and below which a glassy, brittle low mobility state occurs. (Slade & Levine, A polymer science approach to structure/property relationships in aqueous food systems: non-equilibrium behavior of carbohydrate-water systems, *Water Relationships in Foods*, eds. H. Levine and L. Slade. Plenum Press, New York, pp. 29-101 (1991)

Also, Tg varies with molecular weight (MW) impacting mechanical properties. Tg increases with increasing number average MW (Mn), up to a plateau limit for the region of entanglement coupling in rubber-like viscoelastic networks typically at $Mn=1.25\times10^3$ to $10^5$ and then levels off. See, Graessley, Viscoelasticity and flow in polymer melts and concentrated solutions, *Physical Properties of Polymers*, eds. J. E. Mark, A. Eisenberg, W. W. Graessley, L. Mandelkem and J. L. Koenig. American Chemical Society, Washington D.C., pp 97-153 (1984). It should be noted that Tg values can vary substantially even within a series of compounds of the same molecular weight and similar structure.

It is well known that water, acting as a plasticizer, affects the Tg of completely amorphous polymers and both the Tg and Tm of partially crystalline polymers. See, Rowland, Water in Polymers, ACS Symp. Ser. 127, American Chemical Society, Washington, D.C. (1980). The direct plasticizing effect of increasing moisture content at constant temperature is equivalent to the effect of increasing temperature at constant moisture and leads to increased mobility allowing a primary structural relaxation transition at decreased Tg (Rowland, 1980)

Atkins, Basic principles of mechanical failure in biological systems, *Food Structure and Behaviour*, eds. J. M. V. Blanshard and P. Lillford. Academic Press, London, pp. 149-76 (1987) discloses that water plasticizer drops the Tg of most biological materials from about 200° C. (for anhydrous polymers starch, gluten, gelatin (Levine & Slade 1988) to about −10° C. at or above moisture contents near 30% (Levine & Slade 1988). For high biopolymers dry Tg is about equal to 200° C.; and the Tg decreases by 10° C.+/−5° C. for every wt % water at low moisture contents; and Tg is about room temperature at about 20% moisture.

There is a published thermal glass transition curve of gelatinized waxy corn starch as a function of moisture content from about 10% to about 25% in Kalichevsky, The glass transition of amylopectin measured by DSC, DMTA and NMR *Carbohydr. Polym*, 18, 77-88 (1992.). Le Meste,. Glass transition of bread. *Cereal Foods World*, 37, 264-7 (1992) published glass transition of white pan bread reported in terms of onset temperature for softening by TMA. Tg vs. moisture content for bread which begins at 165° C. and decreases by 10° C./wt % moisture from 0 to 10%; and by 5° C./wt % water from 10 to 20% moisture thereby passing through Tg=20° C. at 16.6% water.

As disclosed in U.S. Pat. No. 4,455,333 to Hong et al, the type and amount of sugar may be used to manipulate sugar crystallization to control texture of a baked good. For example, sucrose is a crystallizable sugar and provides a crisp texture to baked goods, whereas humectant sugars such as high fructose corn syrup provide a soft or chewy texture to baked goods. U.S. Pat. No. 5,080,919 to Finley et al discloses that maltodextrins impart brittleness, but in combination with humectants provides a crisp texture and good cookie spread.

Sugar behaves as a plasticizing co-solvent with water, but less so than water alone so that the gelatinization temperature in the presence of sugar is higher relative to the gelatinization temperature of starch in water alone. The antiplasticizing effects of sucrose and other sugars on the gelatinization of native starches are published (Slade Levine 1987).

A published state diagram for sucrose-water (Slade & Levine, Beyond water activity: recent advances based on an alternative approach to the assessment of food quality and safety. Crit. Rev. Food Sci. Nutri., 30, 115-360 (1991) is relevant to manufacturing of cookies and crackers, where finished product texture is dependant in part on the structure function relationships of sucrose as well as flour polymers.

Amemiya, J. & Menjivar, J. A., Mechanical properties of cereal-based food cellular systems. American Association of Cereal Chemist, 77th Annual Meeting, abs. 207, September. 22, Minneapolis, Minn.; ((1992), and Slade & Levine, *Journal of Food Engineering* 24 pp. 431-509; page 477, (1995) disclose a room temperature glass transition occurring at a moisture content at 10% in a cracker formula with virtually no low MW sugars for which the continuous amorphous matrix would be a three dimensional network of developed gluten and gelatinized starch (the latter comprising 70% of the total starch content of the flour) to about 8% moisture Tg room temperature for a rich cracker formulated with sugar.

U.S. Pat. No. 5,523,106 to Gimmler et al discloses raising the glass transition temperature (Tg) of a fruit juice snack having a cookie-like texture. A starch hydrolyzate (e.g. maltodextrin) and a pregelatinized starch are used to adjust Tg and provide a crispy texture. The glass transition temperature (Tg) for the final product is above room temperature, preferably at least about 30° C. and less than or equal to about 60° C.

U.S. Patent Application No. US20020039612 A1 to Gambino et al discloses a baked toastable freezer stable filled waffle. The filled waffle has a batter-based outer casing material that surrounds an inner filling material. Utilization of a filling material having a water content and water activity level below that of the outer casing material enables the formation of a toastable freezer stable filled waffle. The filled waffle can be stored frozen and reheated rapidly in a conventional toaster without burning or charring of the outer casing material and complete heating of the inner filling material.

International Patent Publication No. WO 0511266A1 to Roberts et al discloses a microwaveable food product that is adapted to be cooked or heated prior to consumption. The food product includes a core of filling which generates moisture on cooking or heating, an outer coating adapted to crisp on cooking or heating, and at least one intermediate barrier layer arranged between the core and the coating. The intermediate barrier layer is adapted to substantially prevent migration of moisture between the core and outer coating upon cooking or heating of the product. The intermediate barrier layer includes at least one layer of pasta.

U.S. Patent Application Publication No. US2005/0084567 A1 to Brown et al discloses a dough and a filling for making a toaster pastry. The dough for the toaster pastry is made by forming a blend of ingredients comprising wheat flour of from about 25 to about 44% by weight of ingredients for the dough, wheat farina of from about 13 to about 35% by weight of ingredients for the dough, shortening of from about 1.5 to about 2.5% by weight of ingredients for the dough, and water of from about 25 to about 35% by weight of ingredients for the dough; adding puff pastry shortening in the form of cubes such that the amount of puff pastry shortening is in the range of from about 5 to about 15% by weight of the ingredients for the pastry; and blending the ingredients such that a heterogeneous mixture of the cubes of shortening in the remainder of the ingredients is obtained. The dough is formed into a layered structure, the layered structure comprising a single base sheet of the dough covered with a pastry filling, with a single top sheet of the pastry blend of the dough applied thereover.

U.S. Pat. No. 6,267,998 to Baumann et al discloses a fully baked or fried multi-layered toaster product having a first layer and a second layer wherein the first and second layers are constructed of dissimilar materials. The first layer provides the structural properties required for a toaster product while the second layer provides enhanced characteristics such as taste, texture, and other organoleptic properties. The multi-layered toaster product contains dissimilar dough or batter types and can further include filling and/or particulates and/or toppings.

U.S. Patent Application Publication No. US2005/0249845 A1 to Mihalos et al disclosed a process for preparing filled cracker snacks containing a creamy, lubricious low water activity, and bake stable filler encased within a crisp oven-baked cracker with efficiency and consistency despite the difficult rheology of the filler. A smooth textured, bakable filling is prepared comprising an oil phase, an aqueous phase and a solids phase by blending the ingredients and mixing with high shear to form a homogeneous filler having a viscosity of greater than $1.5 \times 10^5$ centipoise. Also prepared are top and bottom sheets of cracker dough, the bottom of which is moved at a predetermined horizontal velocity for depositing a plurality of continuous or intermittent streams of a bakable filling thereon from a depositor comprising a plurality of openings. The top dough sheet is then placed over the bottom sheet, and the sheets are cut and/or scored in a predetermined pattern to form a composite unbaked dough and filling. Finally, the composite is baked sufficiently to provide a crisp outer crust that exhibits textural and microbiological stability.

The present invention provides a shelf-stable filled, baked crispy snack, such as a fruit filled cracker, which has a baked casing which is crisp over extended periods of time even though both the baked casing and the baked filling have a high moisture content, and the filling is present in large amounts. The textural dichotomy of a crispy baked casing and a moist, soft filling is achieved over extended periods of time without the need for a moisture barrier between the casing and the filler. Use of a triple coextrusion device for providing a moisture barrier is not required. The product may be produced using conventional dough sheeting and filling depositing equipment. The baked snack of the present invention is ready-to-eat out of the packaging and does not have to be toasted, microwaved or further baked, cooked, or heated for consumption, or to achieve a crisp textured casing. The casing remains crisp at temperatures substantially above room temperature and human body temperature. The filled, baked crisp snack may be produced with open ends to provide a visually apparent filling, and filling may be deposited so that it extends to the edges of the casing all without causing leakage or running of the filler from the casing.

SUMMARY OF THE INVENTION

The present invention provides a filled, baked crispy snack having a baked casing which at least substantially or completely envelops or surrounds a baked filling. The baked filling has a soft texture and a moisture content of at least about 10% by weight, preferably from about 12% by weight to about 25% by weight, based upon the weight of the filling. The baked casing contains starch and has a crisp texture at a moisture content of at least about 6% by weight, for example from about 6% by weight to about 12% by weight, preferably from about 7% by weight to about 10% by weight, based upon the weight of the casing at equilibrium with the high moisture content filling. The sugar solids content of the casing may be less than about 20% by weight, for example, less than about 12% by weight, based upon the weight of the casing. The snack of the present invention has an unexpectedly high resistance to deformation or peak force of at least about 400 g, preferably at least about 750 g as measured with a texture analyzer having a 2 mm diameter probe at high moisture contents.

The crisp texture at high casing and filling moisture contents over an extended period of time may be achieved by controlling the glass transition temperature (Tg) of the casing using high Tg ingredients and baking conditions which increase starch gelatinization. At the high moisture contents of the baked casing, the glass transition temperature (Tg) of the baked casing is at least about 75° C., preferably at least about 85° C., most preferably from about 100° C. to about 125° C. Also, the degree of starch gelatinization of the starch in the casing is controlled so that the enthalpy of the starch in the baked casing is less than about 6 J/g of starch, preferably less than about 5 J/g of starch as measured by differential scanning calorimetry (DSC).

High Tg ingredients or crisping or texturizing agents which may be employed include pregelatinized starches, preferably pregelatinized waxy starches, in amounts of from about 5% by weight to about 30% by weight, preferably from about 10% by weight to about 25% by weight, based upon the weight of the casing. The degree of starch gelatinization of the pregelatinized starch may be at least about 90%, preferably at least about 95%, most preferably completely gelatinized. The starch from the flour, such as wheat flour, may be baked under high moisture conditions, high temperature, long bake times, or combinations thereof to increase gelatinization of the flour starch and to raise the Tg of the flour starch and baked casing.

The filled, baked snacks may contain a high amount of filling, with the amount of casing being from about 40% by weight to about 60% by weight, based upon the weight of the casing and filling. The filled, baked crisp snack may be produced so that the filling is visible at opposing ends of the filled, baked crispy snack without substantial or any leakage or running of the filling from the casing. The filling may be deposited so that the filling is filled to the extreme edges of the casing. In embodiments of the invention, the casing may be dockered to pin opposing layers of the casing together. Exemplary high moisture content fillings which may be employed are one or more fruit fillings, vegetable fillings, or cheese fillings.

DETAILED DESCRIPTION OF THE INVENTION

Figure 1:
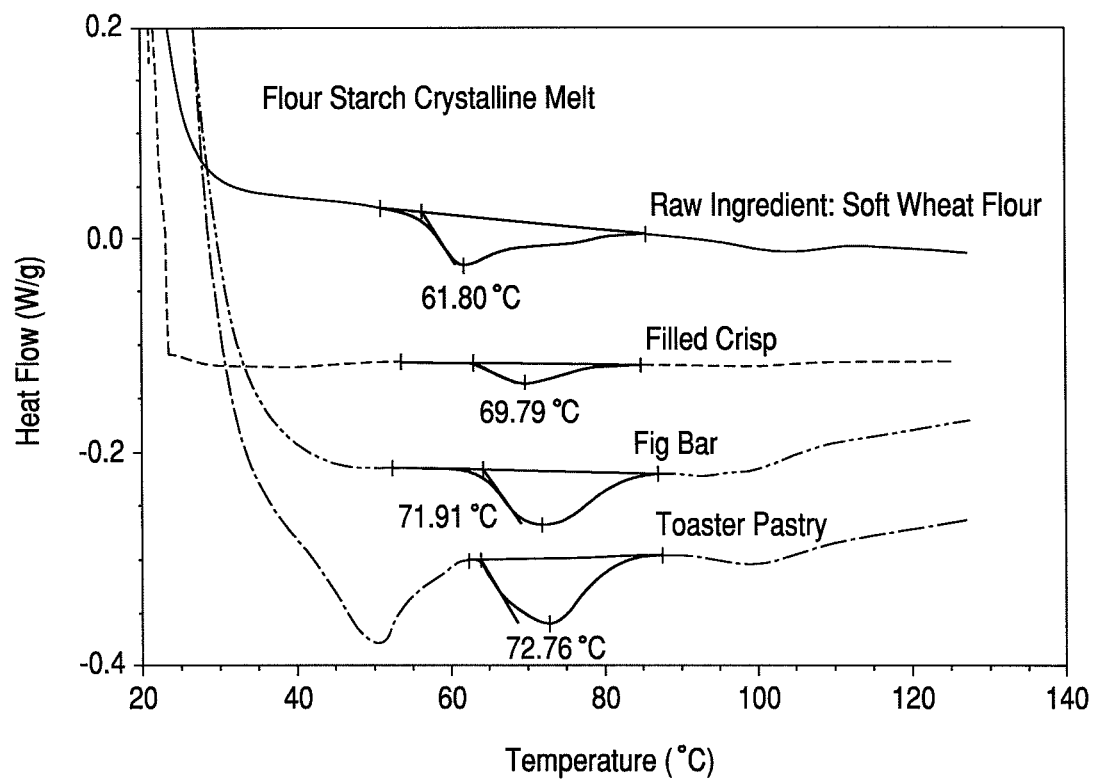
FIG. 1 shows differential scanning calorimetry (DSC) total heat flow curves or melt profiles and extent of flour starch gelatinization for a baked snack of the present invention, commercial filled products, and native flour.

A filled, baked crispy snack which is microbiologically shelf stable and which possesses a crispy textured casing and a moist, soft textured filling over a prolonged period of time is obtained by formulating a casing which when baked has a high glass temperature (Tg) at a high moisture content. The high Tg baked casing permits the use of a high moisture or water content filler in high amounts to provide a strong flavor impact of the filler and a substantial textural dichotomy in the filled, baked, crispy snack. Even though substantial amounts of water may migrate from the high moisture content filler to the casing after baking, the crisp texture of the baked casing is maintained during and after attainment of moisture equilibration. The filled, baked snack of the present invention has an unexpectedly high resistance to deformation or peak force at high baked casing moisture contents. In embodiments of the invention, the filled baked snack may have a resistance to deformation or peak force of at least about 400 g, preferably at least about 750 g as measured with a texture analyzer having a 2 mm diameter probe when the moisture content of the baked casing is at least about 6% by weight, based upon the weight of the casing. The baked snack of the present invention is ready-to-eat out of the packaging and does not have to be toasted, microwaved or further baked, cooked, or heated for consumption, or to achieve a crisp textured casing. The baked snacks of the present invention include non-fermented and fermented reduced fat, low-fat, and no-fat baked products, as well as full-fatted non-fermented and fermented baked products.

The crispy baked casings of the present invention are farinaceous based and include starch. The glass transition temperature (Tg) of the baked casing is above room temperature and above human body temperature at baked casing moisture contents of at least about 6% by weight, so that the product provides a crisp mouthfeel upon consumption. In embodiments of the invention, the glass transition temperature (Tg) of the baked casing may be at least about 75° C., preferably at least about 85° C., most preferably from about 100° C. to about 125° C. Also, the degree of starch gelatinization of the starch in the casing is controlled so that the enthalpy of the starch in the baked casing is less than about 6 J/g of starch, preferably less than about 5 J/g of starch as measured by differential scanning calorimetry (DSC).

Increasing the degree of starch gelatinization decreases the enthalpy of the starch and increases the glass transition temperature of the starch. Increasing the degree of gelatinization of starch in the casing may be achieved during baking of the casing dough and by the addition of a pregelatinized starch. The starch flour, or the starch contained in flour, such as wheat flour, is generally essentially ungelatinized prior to baking. During baking, higher dough moisture contents, baking temperatures above the gelatinization temperature of starch, and longer baking times tend to promote a higher degree of starch gelatinization of the starch. The higher dough moisture content may be achieved by the addition of formula water to the dough and by moisture migration from the high water content filling to the dough during baking. In addition, other dough ingredients, such as fat and sugars affect the degree of starch gelatinization which may be achieved during baking. For example, fat tends to coat the starch granules which impedes water penetration into the granules, and sugars tend to compete with starch for water, thereby reducing the amount of water available for gelatinizing the starch, and consequently reducing the degree of starch gelatinization.

Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," *Cereal Foods World*, Vol. 33, No. 3, pgs. 306-311 (March 1988). In embodiments of the present invention, the starch granules of the pregelatinized starches may be at least about 90% gelatinized, preferably at least about 95% gelatinized, most preferably completely gelatinized.

As long as it raises the Tg of the baked casing, and avoids an undesirable brittle or hard texture, the pregelatinized starch employed in the present invention may be derived from any source. Exemplary of starches which may be employed are corn, potato, sweet potato, wheat, rice, sago, tapioca, waxy maize, sorghum, legume starch, brewer's spent grain, and mixtures thereof. A pregelatinized waxy starch, such as pregelatinized waxy maize starch is preferred in the present invention.

Pregelatinized waxy starches or pregelatinized high amylopectin-content starches which may be used in the present invention include pregelatinized waxy maize starch, pregelatinized waxy rice starch, and mixtures thereof. The preferred pregelatinized waxy starch for achieving a substantial increase in the Tg of the baked casing, while providing cohesiveness, dough extensibility, and dough machinability is a modified waxy maize starch such as Modified Corn Starch X-Pand'R F4-612 produced by A. E. Staley Manufacturing Company. The preferred pregelatinized waxy maize starch is not chemically modified nor acid hydrolyzed. The pregelatinized waxy starch preferably has a moisture content of less than or equal to about 6% by weight and a pH of about 5 to about 6. The Brabender neutral viscosity of the pregelatinized waxy starch may be at least 680BU at 25° C., with the time required to reach peak viscosity at 25° C. being a maximum of 20 minutes. The particle size distribution of the pregelatinized waxy starch may be less than or equal to about 20% by weight retained on a 50-mesh screen and less than or equal to about 30% passing through a 200-mesh screen. If the particle size is too small, the pregelatinized starch tends to hydrate predominately on the surface. Increasing the particle size of the pregelatinized waxy starch tends to increase its ability to form homogeneous dry blends with the pregelatinized potato starch and optional, modified potato starch and reduces its tendency to form lumps.

The pregelatinized starch, such as pregelatinized waxy maize starch, or other high Tg ingredients or crisping or texturizing agents which may be employed in amounts of from about 5% by weight to about 30% by weight, preferably from about 10% by weight to about 25% by weight, based upon the weight of the casing.

Exemplary of other high Tg ingredients or crisping or texturizing agents which may be employed, in embodiments of the invention include edible biopolymers, or starch derivatives which exhibit a Tg of least about 75° C. at a baked filling moisture content of at least about 6% by weight of the casing, such as amylopectin, phytoglycogen, extruded starch, pullulan, and dextran. See, B. Borde et al J. Carbohydrate Polymers 48 (2002) 83-86, and Roos and Karel, Paper no. 7a, AIChE Summer Meeting, San Diego, Aug. 19-22, 1990, "Phase Transitions of Mixtures of Amorphous Food Components."

Process-compatible ingredients, which can be used to modify the texture of the products produced in the present invention, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Fructose is the preferred reducing sugar, because of its ready availability and its generally more enhanced browning and flavor-development effects. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be used to reduce hardness of the baked product and provide flavor and color.

In addition to the humectant sugars, other humectants, or aqueous solutions of humectants which are not sugars or possess a low degree of sweetness relative to sucrose, may also be employed in the dough. For example, glycerol, sugar alcohols such as mannitol, maltitol, xylitol and sorbitol, and other polyols, may be used as humectants. Additional examples of humectant polyols (i.e. polyhydric alcohols) include glycols, for example, propylene glycol and hydrogenated glucose syrups. Other humectants include sugar esters, dextrins, hydrogenated starch hydrolysates, and other starch hydrolysis products.

In embodiments of the present invention, the total sugar solids content, or the humectant texturizing-ingredient content, of the doughs may range from zero up to about 20% by weight, for example, less than about 12% by weight, based upon the weight of the baked casing or the dough, with savory snacks generally possessing lower amounts of total sugar solids than do sweet snacks. The preferred sugars for inclusion in the doughs of the present invention are crystalline sucrose and corn syrup.

The wheat flour used in the wheat-based snacks of the present invention may be a flour of common wheat or *triticum aestivum*, and/or a flour of club wheat. Durham wheat generally provides a texture which is hard rather than crisp. In embodiments of the invention, it may be included in amounts which do not adversely affect texture, for example, up to about 10% by weight of the wheat flour. Common wheat flour is preferred. The wheat flour may be from winter wheat or spring wheat, either of which may be soft or hard. The soft or hard wheat may be either red or white. Mixtures of different wheat flours may be used in the present invention. The wheat flours used in the present invention are preferably not extensively bleached, because extensively bleached flours tend to produce a cake-like, non-crispy texture. The protein or gluten content of the wheat flour should be sufficient to provide a sheetable dough at temperatures of from about room temperature to about 125° F. Conventional wheat flours used for cookie and cracker production may be used in the present invention. Exemplary gluten contents of the wheat flours may range from about 7% to about 11% by weight of the flour.

The wheat flour may be used in an amount of from about 30% by weight to about 80% by weight, preferably from about 40% by weight to about 65% by weight, based upon the weight of the dough or the baked casing. Other flours, such as rice flour, corn flour, oat flour, and the like, tend to result in a mealy, styrofoam-like, less crunchy texture. They may be used in amounts which do not adversely affect flavor and a crispy, crunchy texture.

Unless otherwise indicated, all weight percentages are based upon the total weight of all ingredients forming the doughs or formulations of the present invention, except for inclusions such as flavor chips, nuts, raisins, and the like. Thus, "the weight of the dough" does not include the weight of inclusions.

The moisture contents of the doughs of the present invention should be sufficient to provide the desired glass transition temperature (Tg), and consistency to enable proper forming, machining, and cutting of the dough. The total moisture content of the doughs of the present invention will include any water included as a separately added ingredient, as well as the moisture provided by flour (which usually contains about 12%, to about 14% by weight moisture), and the moisture content of other dough additives included in the formulation, such as high fructose corn syrup, invert syrups, or other liquid humectants.

Taking into account all sources of moisture in the dough or batter, including separately added water, the total moisture content of the doughs or batters of the present invention is generally less than about 50% by weight, preferably less than about 35% by weight, based upon the weight of the dough or batter. Generally, lower dough moisture contents results in lower heating requirements, and less blistering and bubbling, but lower starch gelatinization. In producing filled, baked crispy snacks in accordance with the present invention, the doughs may generally have a moisture content of greater than about 20% by weight, generally from about 23% by weight to about 33% by weight, preferably from 25% by weight to about 30% by weight, based upon the weight of the dough.

Oleaginous compositions which may be used to obtain the doughs and baked goods of the present invention may include any known shortening or fat blends or compositions useful for baking applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention comprise soybean oil.

In producing filled, baked crisp snacks in accordance with the present invention, the doughs may generally have a fat or oil content of less than about 30% by weight, generally from about 10% by weight to about 20% by weight, based upon the weight of the flour.

Baked goods which may be produced in accordance with the present invention include reduced calorie baked goods which are also reduced fat, low fat or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

In addition to the foregoing, the doughs employed in the invention may include other additives conventionally employed in crackers and cookies. Such additives may include, for example, milk by-products, enzyme modified milk powder, whey, soluble or insoluble edible fiber, such as inulin or other fructooligosaccharides, resistant starch, oat fiber, corn bran, wheat bran, oat bran, rice bran, and soluble polydextrose, egg or egg by-products, cocoa, peanut butter, vanilla or other flavorings, flour substitutes or bulking agents, such as polydextrose, hollocellulose, microcrystalline cellulose, mixtures thereof, and the like, as well as inclusions or particulates such as nuts, raisins, coconut, flavored chips such as chocolate chips, butterscotch chips, white chocolate chips, peanut butter chips, caramel chips, and the like in conventional amounts. In preferred embodiments an insoluble fiber such as resistant starch or oat fiber may be employed in the casing. In embodiments of the invention, these additives, such as fiber, chocolate chips or other flavor chips, may be employed in amounts up to about 25% by weight, for example from about 10% by weight to about 20% by weight, based upon the weight of the dough.

A source of protein, which is suitable for inclusion in baked goods, may be included in the doughs of the present invention to promote Maillard browning. The source of protein may include non-fat dry milk solids, dried or powdered eggs, mixtures thereof, and the like. The amount of the proteinaceous source may, for example, range up to about 5% by weight, based upon the weight of the dough.

The dough compositions of the present invention may contain up to about 5% by weight of a leavening system, based upon the weight of the dough. Exemplary of chemical leavening agents or pH-adjusting agents which may be used include alkaline materials and acidic materials such as sodium bicarbonate, ammonium bicarbonate, calcium acid phosphate, sodium acid pyrophosphate, diammonium phosphate, tartaric acid, mixtures thereof, and the like. Yeast may be used alone or in combination with chemical leavening agents.

Enzymes conventionally used in cracker production, such as amylases and proteases, may be used in conventional amounts in embodiments of the present invention.

The doughs of the present invention may include antimycotics or preservatives, such as calcium propionate, potassium sorbate, sorbic acid, and the like. Exemplary amounts may range up to about 1% by weight of the dough, to assure microbial shelf-stability.

Emulsifiers may be included in effective, emulsifying amounts in the doughs of the present invention. Exemplary emulsifiers which may be used include, mono- and di-glycerides, polyoxyethylene sorbitan fatty acid esters, lecithin, stearoyl lactylates, and mixtures thereof. Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Examples of natural lecithins which may be used include those derived from plants such as soybean, rapeseed, sunflower, or corn, and those derived from animal sources such as egg yolk. Soybean-oil-derived lecithins are preferred. Exemplary of the stearoyl lactylates are alkali and alkaline-earth stearoyl lactylates such as sodium stearoyl lactylate, calcium stearoyl lactylate, and mixtures thereof. Exemplary amounts of the emulsifier which may be used range up to about 3% by weight of the dough.

In embodiments of the invention, the doughs which are employed in the present invention may be produced by admixing the dry ingredients such as sucrose, dry flavoring and additive ingredients, such as whey, cocoa, and salt, with the pregelatinized waxy maize starch to obtain an at least substantially homogeneous dry preblend. The dry preblend may then be creamed with the liquid ingredients such as shortening or fat, high fructose corn syrup, water, and emulsifier to obtain an at least substantially homogeneous creamed mixture. The creamed mixture may then be admixed with the flour, leavening agents, and optionally any remaining other minor dry ingredients such as oat fiber, salt or whey, to obtain an at least substantially homogeneous dough. Inclusions, such as particulate flavoring ingredients, such as chocolate chips may then be admixed with the dough to obtain an at least substantially homogeneous finished dough.

The dough may then be divided and formed into two sheets using a conventional dough sheeter for lamination with the filling. The dough sheet thickness for the top and bottom sheets may be at least substantially the same or different.

The filling employed in the present invention may be produced in conventional manner and may generally include invert sugar, sugar or sucrose, apple powder, fruit puree and water. Modified food starch and gums, such as pectin, may be added to aid texture and control spread in the oven during baking. Natural and artificial flavor, food acids and salt are used as flavorings. Glycerin may also be used as a humectant to soften filler texture and control relative humidity (RH) or water activity ($A_w$). A preservative such as sodium benzoate may also be used in the filling composition. The fillings or fillers may have at least about 1% by weight, generally from about 1.1% by weight to about 5% by weight, for example from about 1.2% by weight to about 2.5% by weight, based upon the weight of the filling, fruit or vegetable fiber, or other fibers such as fructooligosaccharides or polydextrose can be added. Any edible filling or filler, including commercially available fillers, may be employed in embodiments of the invention which meets, or is modified to meet, the following criteria for moisture, relative humidity and bakability:

| Filling Parameter | Range | Preferred Range | Example |
|---|---|---|---|
| Erh $A_w$: | 0.6-0.7% | 0.62-0.66% | 0.64% |
| Bake Spread*: | 2-2.5 inches | 2.1-2.3 inches | 2.2 inches |
| pH: | 2.5-3.5 | 2.8-3.2 | 3.0 |
| Brix (Solids): | 72-80% | 74-78% | 76.5% |
| Moisture | 14-30% | 19-25% | 21.8% |

*The bake spread test consists of cooking the filler for 10 minutes at 210° C. in a 35 mm diameter ring that is 5 mm high, and then measuring the distance and inputting into the formula: Bake spread = 100 − ((P − 3.5)/3.5) * 100, where P is the average baked diameter from duplicate tests In preferred embodiments of the invention, the filling may contain soluble or insoluble fiber, such as inulin or other fructooligosaccharides, resistant starch, oat fiber, corn bran, wheat bran, oat bran, rice bran, and soluble polydextrose, and mixtures thereof. Soluble fiber, such as inulin or other fructooligosaccharides, and polydextrose are preferred for use in the filling. The fiber may be employed in the filling in amounts up to about 25% by weight, for example from about 10% by weight to about 20% by weight, based upon the weight of the filling.

Exemplary fillings which may be employed are one or more fruit fillings, such as apple, apple-cinnamon, strawberry, raspberry, mixed berry, peach, cherry, banana, and orange fillings, vegetable fillings, such as broccoli, cauliflower, carrot, green bean, and mixed vegetable fillings, cheese fillings, meat fillings, peanut butter fillings, jam fillings, and jelly fillings.

The filling and the dough sheets may be laminated together, and cut into pieces having a bottom dough layer, a top dough layer, and the filling in-between or surrounded or encapsulated by the two dough layers using conventional dough laminating and filling depositing equipment. Exemplary equipment and methods for producing the dough sheets or layers, laminating the dough layers and filling, and forming the laminate into pieces are described in U.S. Patent Publication No. 2005/0249845 A1 to Mihalos et al, published Nov. 10, 2005, the disclosure of which is herein incorporated by reference in its entirety.

In embodiments of the invention, the casing dough may be made in a conventional dough mixer. Once fully mixed and proofed as desired, the dough may be fed to two separate sheeting apparatus for preparing a top dough sheet and a bottom dough sheet. Both top and bottom sheets may be formed in the same way. From a feed hopper, the dough for each may be sheeted and fed to a conventional dough sheeter or laminator, such as a cut sheet laminator. The dough sheet may be produced as a single, unlaminated sheet, or it may be laminated to from 2 to 8 layers, e.g., about 4 to 6 layers, and gauged. Other laminators, such as swing arm laminators may also be employed. In preferred embodiments, each of the bottom dough sheet and the top dough sheet is a single layer, non-laminated dough sheet.

The control of sheet thickness may be achieved in three stages with primary gauge rolls, intermediate gauge rolls and finish gauge rolls. The final thickness of the dough sheets may preferably be from about 0.035 inches to about 0.055 inches, more preferably from about 0.04 inches to about 0.05 inches. After sheeting and gauging, the sheets may be relaxed on a relaxing conveyor for about 5 to 20 seconds, or so, and then dockered using dockering pins. The dough layers may be dockered separately or at the same time to pin the layers and the filling together. In preferred embodiments, only the top layer or sheet is dockered and it is performed before lamination with the filling and bottom layer so as to avoid flattening or crushing of the laminated product. In preferred embodiments the docker holes are large enough so that the filling is visually apparent through the baked upper dough layer of the casing. The dockering may include three rows of five dockering holes along the length of the product, with the center row being offset from the two other outer rows.

The bottom dough sheet may be moved under the depositor at a uniform, predetermined speed. The depositor may preferably deposit a plurality of preferably continuous streams of a bakable filling on the bottom sheet of dough. The stream may be deposited intermittently, but a continuous stream is preferred in the production of snack products having the filling extend to the product ends and sides or extreme periphery and be visually apparent from the ends. The depositor may include a plurality of depositor openings and cause the filling to flow at a predetermined rate from each of the plurality of openings. The depositor can be of the type produced by Robert Reiser & Co as a VEMAG (HP-15C model) Robot vacuum filler with a double screw and a multi-outlet waterwheel depositor. The number of openings will depend on, among other factors, the dimensions of the product, the width of the line and the cutter design.

Following depositing of the filling ribbons on the bottom sheet of dough, a top of dockered dough is placed over the bottom sheet of dough having the bakable filling thereon. Then, pressure is applied to the dough sheets in predetermined areas to at least partially seal the bakable filling between the sheets of dough at the extreme perimeter of the bakable filling and to cut and/or score the dough in a predetermined pattern to form a composite unbaked dough and filling. The cut may be made in the machine direction, or direction of travel of the dough sheets to provide a plurality of strips of the composite. Depending on the particular product configuration, the pieces can be incompletely cut, i.e., scored, between them or can be essentially fully cut such that the products easily separate as desired. In preferred embodiments a plurality of streams of filler may be layed out, laminated, or deposited on the bottom dough sheet and cover those with a top sheet of dough. In preferred embodiments, the sealing and cutting does not result in longitudinal, peripheral edges of dough or ledges but rather results in a continuous, smooth, slightly curved cross section of the dough and filled, baked snack in the cross-machine direction or direction perpendicular to the direction of travel of the dough layers.

In embodiments of the invention, a reciprocating or rotary cutter (tied in the case of continuous dough feed and filler depositing) may be employed to cut the strips of composite or laminate in the cross-machine direction to obtain individual pieces of composite or laminate having exposed filling at the cut ends, along substantially the whole width of the piece.

Prior to baking, the dough and filler laminates or composites may be passed through a topper, a salter, or other device to provide a desired prebake finish. For example, a topping containing cinnamon, sugar, and fruit juice may be applied.

Then, the pieces of laminates or composites may be baked to a final moisture content for the filled baked snack. Typical ovens for crackers can be employed, such as forced air and direct gas fired ovens.

While baking times and temperatures will vary for different dough or batter formulations, oven types, etc., in general, commercial baking times may range from about 2.5 minutes to about 13 minutes, and baking temperatures may range from about 250° F. to about 600° F. For example, in a five zone indirect gas fired oven, the first zone may be at about 300° F. to about 350° F., the second zone may be at about 480° F. to about 500° F., the third zone may be at about 500° F. to about 560° F., the fourth zone may be at about 460° F. to about 475° F., and the fifth zone may be at about 390° F. to about 425° F., and the baking time may be about 9 minutes to about 11 minutes.

Generally, the product is baked to a golden brown having substantial flavor due to Maillard browning reactions in the oven. The baking is generally conducted such that the product laminate or composite before baking undergoes a total weight loss of water of from about 14% by weight to about 18% by weight. For example, the laminate or composite filled dough pieces may be baked from a net moisture content of about 25% by weight down to a final net moisture content of about 21% by weight, for a total moisture weight loss of about 16% during baking. The filled baked product is ready-to-eat and requires no further baking or toasting.

After baking, a conventional snack topping may be applied such as a chocolate topping, topping oil, spices, sugars, icings, creams, and the like. For example, icings comprising a mixture of one or more sugars and shortening or fat may be applied as stripes upon the filled, baked snacks.

The filled, baked snacks may then be cooled and packaged, in moisture barrier packaging such as poly foil packs, and placed in a protective carton.

The filled baked products of the present invention may have a relative vapor pressure, relative humidity (RH) or "water activity" ($A_w$) at equilibrium of less than about 0.7, preferably less than about 0.6, for example from about 0.40 to about 0.6, for preservative free microbial shelf-stability. However, the total water content, of the products is at least about 6% by weight, generally at least about 8% by weight, for example, from about 9% by weight to about 15% by weight, based upon the weight of the baked product, exclusive of inclusions. The flour, pregelatinized waxy maize starch, one or more sugars, and other ingredients are least substantially uniformly distributed throughout the baked casing of the filled, baked crispy snacks of the present invention.

The filled, baked crispy snacks of the present invention may have a microbiological shelf-stability, and a shelf stable textural dichotomy of a crisp casing and a soft, moist filling for at least about 3 months, preferably at least about 6 months, most preferably at least about 12 months when packaged in proper moisture barrier packaging. In preferred embodiments, the filled, baked crispy snacks may be in the form of a bar, with filling exposed at the opposed open ends, as in a FIG NEWTON®. The filling may be exposed or visible along portions of the longitudinal sides of the bar. The cross section of the bar may have a smooth curve or arc across the entire width of the top casing layer, with no flattened peripheral edge along the length of the bar. The bottom layer of the casing of the bar may be substantially flat. The cross-section of the bar may be shaped like a sector of a circle, formed by a chord, or semicircular. The casing preferably exhibits a substantially uniform leavened cell structure with no or substantially no puffing as in extruded products. In embodiments of the invention, the bar may have a length of about 3 inches to about 4 inches, a width of about 1.25 inches to about 1.75 inches, and a thickness of about 0.25 inches to about 0.5 inches.

The present invention is further illustrated in the following examples, where all parts, ratios, and percentages are by weight, all temperatures are in ° F., and all pressures are atmospheric unless otherwise stated:

EXAMPLE 1

In this example, dough is prepared, formed into a filled layered piece, baked and analyzed to determine the extent of gelatinization of the flour starch in the baked product. Then, a pregelatinized waxy corn starch is added to the formula and the thermal glass transition properties of the finished product is analyzed.

A. Dough Preparation

The dough is comprised of flour, water, fat, sugars, texturizing starch and leavening agents. The flour has a protein content of about 8%, a moisture content of about 13% by weight, and an ash content of about 0.48% by weight. The sugars and water in the formula are adjusted to a sugars to water ratio (S/W) ratio of 0.35 and a total solvent (sugar+syrups+formula water) of 44.5 g/cwt flour is obtained which provides sufficient moisture at sugars solids concentrations allowing for flour starch gelatinization. The sugar to water ratio is determined by adding the total sugar solids in the formula and dividing by the total water added to the formula (I.e. syrup water and formula water). The ingredients and their relative amounts used to prepare the dough, the moisture contents of the ingredients and dough, and the dry weights of the ingredients are:

| ingredient | totl wt | moist | DWT | Dough |
|---|---|---|---|---|
| Vegetable shortening | 14.18 | 0.20% | 14.15 | 8.83% |
| 62 DE CS | 2.54 | 18.00% | 2.08 | 1.58% |
| sucrose | 9.46 | 0.50% | 9.41 | 5.89% |
| salt | 0.92 | 0.20% | 0.92 | 0.57% |
| ammonium bicarbonate | 0.178 | 99.50% | 0.00 | 0.11% |
| sodium bicarbonate | 0.33 | 50.00% | 0.17 | 0.21% |
| Flavor | 0.53 | 0.20% | 0.53 | 0.33% |
| Regular Cookie Flour | 100 | 13.00% | 87.00 | 62.25% |
| water | 32.5 | 100.00% | 0.00 | 20.23% |
| protease | 0.31 | | | |
| Total wt- | 160.638 | | Dry slds- | 114.26 |
| Total moisture | | 28.87% | | |

The ingredients may be mixed in two stages. Fat, sugar, corn syrup and salt may be mixed for 0.5 min on low. A water jacketed mixer maybe used, and the temperature target for the dough is 110° F. with a range of from about 106° F. to about 114° F. After the first stage mixing, the remaining ingredients may be added, which are flour, soda, ammonium bicarbonate, protease, and water. Ammonium bicarbonate and protease may each be separately dispersed in a small amount of cool water held out from the total formula water. The dough may be mixed for about 8 minutes on low to obtain an at least substantially homogeneous dough. The temperature of the formula water may be set to about 160° F. with a temperature range of 150° F. to 170° F.

B. Filling and Forming

The dough may be divided and formed into two sheets using a dough sheeter. Dough thickness for the bottom sheet may be about 0.049 inches and for the top sheet the dough thickness may be about 0.040 inches. Filling may be spread in numerous about 1.5 inch wide lanes across the sheet as the bottom dough sheet passes under the filler depositor. A top sheet, with docker holes, may be laid down and the layered dough may be cut into 1.5 inch by 3.75 inch by 0.39 inches thick pieces, with a rotary cutter.

The filling employed may be a fruit filling or filler containing invert sugar, sugar, apple powder, fruit puree, water, modified food starch, pectin, natural and artificial flavor, food acids, salt, glycerin, and sodium benzoate. The filler may have about 1.35% by weight fruit or vegetable fiber. The filler meets the following criteria for moisture, relative humidity and bakability:

1. an Erh $A_w$ of about 0.64%,
2. a bake spread of about 2.2 inches, *
3. a pH of about 3.0,
4. a Brix (Solids) of about 76.5%, and
5. a moisture content of about 21.8% by weight, based on the weight of the filling.

The filler reaches to the product edges and filler is visible at each open end. A topping including of cinnamon, sugar and fruit juice may be applied. The weight of each layer may be as follows:

Sheeting/Extruding/Rotary/Wash/Topping: (1 piece)
  Top & Bottom (2 pcs) Dough Wt=10.0 (9.5-10.5) grams
  Filling+Top & Bottom Dough Wt=16.5 (16.0-17.0) grams
  Wash+Filling+Top & Bottom Wt=16.75 (16.25-17.25) grams
  Topping+Wash+Filling+Top & Bottom 17.0 (16.5-17.5) grams
  Length: 3.75 (3.65-3.85) inches
  Width: 1.5 (1.4-1.6) inches C. Baking The laminated dough and filler pieces may be baked to obtain a filled snack product with a golden brown color and substantial flavor due to Maillard browning reactions in the oven. A direct gas fired oven with 7 zones may be employed such that the product is baked from a net moisture content of about 25% by weight down to a final net moisture content of about 11.9% by weight, for a total weight loss of about 16% during baking. The product is ready to eat and requires no further baking or toasting. The product may be packaged and held for at least one month before thermal glass transition and textural analysis are conducted.

D. Analysis to Determine Extent of Flour Starch Gelatinization

The melt profile and the extent of flour starch gelatinization in the baked product may be determined by Modulated Differential Scanning Calorimetry (MDSC). The analysis technique involves the heating of a material at a steady rate with a programmed saw-tooth pattern of heating and cooling imposed upon the steady rate. The fluctuation in temperature allows a more precise analysis of the thermal melt because it separates overlapping thermal events such as cold crystallization of sugars.

The instrument and method used to characterize the flour starch in the baked dough is:
  a. Instrument: TA Instruments Differential Scanning Calorimeter (DSC), which includes the TA Instruments DSC Q1000 Controller software, TA Instruments Q1000 Module and the TA Instruments RCS unit.
  b. Sample Pans: Perkin-Elmer stainless steel high pressure capsules with rubber O-ring.

c. Sample preparation: The ingredients are mixed with water at a 1:1 ratio, weight sample to weight water. Approximately 35 to 50 milligrams are weighed in a DSC sample pan; enthalpy is calculated on a flour weight basis (e.g. 50 mg–less added water–less non-flour solids=flour weight). Measured enthalpy is compared to raw ingredient flour, equal moisture basis.

d. Instrument calibration: The MDSC is calibrated for baseline, cell constant, temperature and heat capacity in a known manner:
   1. Baseline calibration: using two empty sample pans the baseline slope and baseline offset are determined over a temperature range from 10° C. to 150° C., with a heating rate of 5° C./min.
   2. Cell constant calibration: indium is used as a standard.
   3. Temperature calibration: calibrated at one point using indium.

e. The method is:
   1: Equilibrate at 20.00° C.
   2: Modulate +/−1.00° C. every 80 seconds
   3: Data storage: On
   4: Ramp 2.50° C./min to 130.00° C.
   5: Isothermal for 1.00 min
   6: Data storage: Off
   7: End of method The MDSC calibration data analysis software program is used to make the proper MDSC calibration corrections with the instrument in the calibration mode. Heat capacity is calibrated using sapphire, in a known manner. The sample is characterized with the DSC in the modulated mode using a ramp rate of 2.5° C. from 50° C. to 150° C. To analyze the results, the total heat flow curve is integrated from 57.5° C. to 80° C. to measure the enthalpy of the crystalline starch remaining in the baked product, Samples are run at least in duplicate.

Results of the MDSC analysis for baked product, commercial filled products and native flour are shown in FIG. 1. The onset of melting occurs at about 55° C., the endothermic peak or melting point is about 70° C., and the endpoint of melting occurs at about 85° C. The software calculates the enthalpy of the endothermic peak in J/g. Flour enthalpy values for baked product ranged from about 4.0 J/g starch to about 5.0 J/g starch and are substantially lower than starch enthalpy values of 7.6 J/g and 7.9 J/g recorded for leading commercial filled products, Fig Newtons® and Toaster Pastry, respectively. Product formulated according to the present invention had substantially more gelatinized starch than other commercial filled products, which is a distinguishing material property especially important for maintaining the crisp product texture after baking. The melting point and enthalpy for each product are:

| Product | Melt point | Enthalpy |
| --- | --- | --- |
| Filled Crisp | 69.8 | 4.46 |
| Newton | 71.9 | 7.62 |
| Toaster Pastry | 72.8 | 7.96 |
| Native Flour | 61.8 | 7.62 |

E. Formulating with Texturizing Starch

Pregelatinized waxy corn starch is added to the formula and the thermal glass transition properties of the finished product is analyzed. Most cookie and semisweet biscuit texture is defined by the sugars composition and, due to their inherent material properties are not crisp at ambient temperature, at moisture contents above 6% by weight.

Dough preparation, filling, forming and baking were performed in the manner described in Sections A, B, and C above. Pregelatinized waxy corn starch was added with the flour in the amount of 11 lb per 100 lb of flour according to the formula listed below:

| ingredient | totl wt | moist | DWT | Dough |
| --- | --- | --- | --- | --- |
| Vegetable shortening | 14.18 | 0.20% | 14.15 | 8.26% |
| 62 DE CS | 2.54 | 18.00% | 2.08 | 1.48% |
| sucrose | 9.46 | 0.50% | 9.41 | 5.51% |
| salt | 0.92 | 0.20% | 0.92 | 0.54% |
| ammonium bicarbonate | 0.178 | 99.50% | 0.00 | 0.10% |
| sodium bicarbonate | 0.33 | 50.00% | 0.17 | 0.19% |
| Flavor | 0.53 | 0.20% | 0.53 | 0.31% |
| pregel waxy corn starch | 11 | 0.10% | 10.99 | 6.41% |
| Regular Cookie Flour | 100 | 13.00% | 87.00 | 58.26% |
| water | 32.5 | 100.00% | 0.00 | 18.94% |
| protease | 0.31 | | | |
| Total wt- | 171.638 | Dry slds- | 125.25 | |
| Total moisture | 27.03% | | | |

Baked product was allowed to equilibrate for at least one month in a sealed package before the thermal properties were measured. After full equilibration to moisture content above 5% by weight, most likely about 8% by weight to about 9% by weight, the measured product had a thermal glass transition significantly above room temperature, exemplifying the material property of crispness associated with materials in a crisp, glassy state.

Thermal glass transition temperature was determined by Modulated Differential Scanning Calorimetry (MDSC). In this technique, the material being analyzed is heated at a steady rate with a programmed saw-tooth pattern of heating and cooling imposed upon the steady rate. The fluctuation in temperature allows a more precise analysis of the thermal glass transition point because it separates overlapping thermal events such as cold crystallization of sugars.

The instrument and method used to characterize the thermal glass transition temperature in the product is:
   a. Instrument: TA Instruments Differential Scanning Calorimeter (MDSC), which includes the TA Instruments DSC Q1000 Controller software, TA Instruments Q1000 Module and the TA Instruments RCS unit.
   b. Sample Pans: Perkin-Elmer stainless steel high pressure capsules with rubber O-ring.
   c. Sample preparation: Approximately 35 to 50 milligrams are weighed in a stainless steel sample pan; and the total weight in the pan was multiplied by the percent baked weight of pregelatinized waxy corn starch in the formula to calculate the weight used for determining heat flow/g, so that raw material and finished product comparison could be made; and the software automatically calculates glass transition
   d. Instrument calibration: The MDSC is calibrated for baseline, cell constant, temperature and heat capacity in a known manner:
      1. Baseline calibration: using two empty sample pans the baseline slope and baseline offset are determined over a temperature range from 10° C. to 150° C., with a heating rate of 5° C./min.
      2. Cell constant calibration: indium is used as a standard.
      3. Temperature calibration: calibrated at one point using indium.
   e. The Method Used is: The MDSC calibration data analysis software program is used to make the proper MDSC calibration corrections with the instrument in the calibration mode. Heat capacity is calibrated using sapphire, in a known manner. The sample is characterized with the MDSC in the modulated mode using the following parameters:

Method Log:
1: Data storage: Off
2: Equilibrate at 110.00° C.
3: Equilibrate at 4.00° C.
4: Modulate +/−1.00° C. every 80 seconds
5: Data storage: On
6: Ramp 5.00° C./min to 155.00° C.
7: Data storage: Off Samples are run at least in duplicate.

Figure 2:
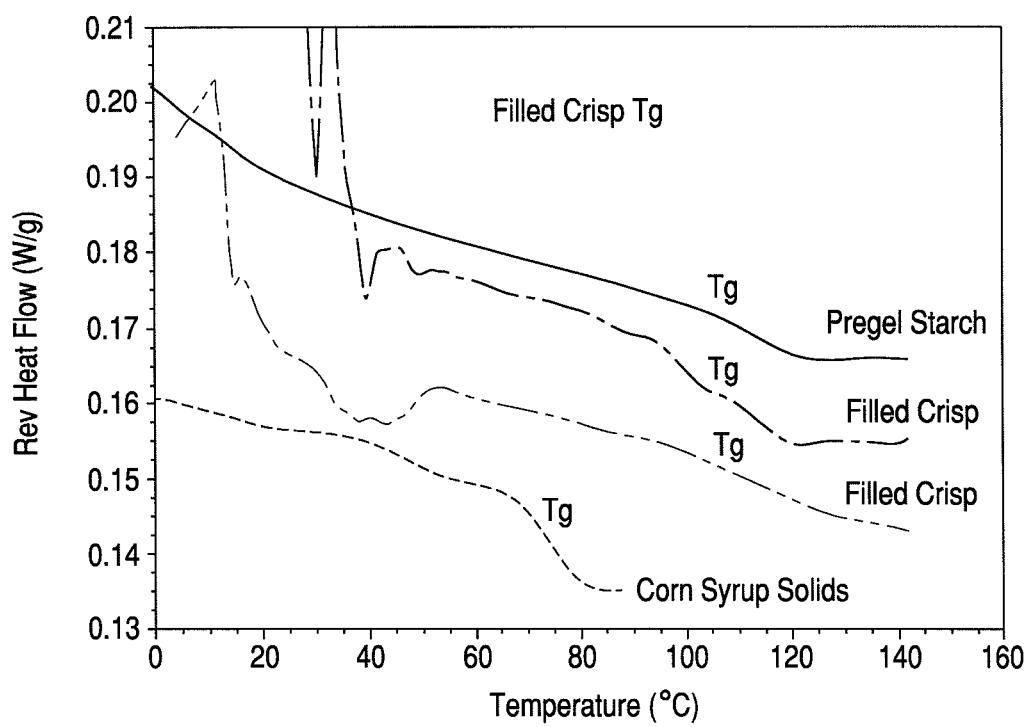
FIG. 2 shows DSC reversing heat flow curves for the determination of thermal glass transition temperature of a baked snack of the present invention, a pregelatinized waxy corn starch employed in the present invention, and corn syrup solids.

The thermal glass transition temperature of pregelatinized waxy corn starch at a moisture content of about 10% by weight is shown in FIG. 2, as an inflection of the reversing heat flow signal. The transition occurs at 112.75° C. meaning the starch is in a glassy, crisp state at room temperature. The 112.75° C. thermal transition can be compared to the 72° C. thermal glass transition observed for 42 DE dextrose syrup solids at a moisture content of about 3% by weight. As shown in FIG. 2, a thermal glass transition is measured in the product at a moisture content of about 8% by weight as a temperature of 110° C. and intensity of about 15 mW/mg over a 20° C. temperature range. The glass transition temperature (Tg) and moisture content for each product is:

| PRODUCT | (Tg) | Moisture Content, wt % |
|---|---|---|
| Pregelatinized waxy corn starch | 112.75° C. | 10% |
| Filled Crispy Snack | 110.0° C. | 8% |
| 42 DE corn syrup solids | 72° C. | 3% |

The pregelatinized waxy corn starch works in combination with gelatinized flour starch to produce a crisp texture at high moisture. Product formulated according to the present invention has a visible thermal transition at about 107° C. which is a distinguishing material property associated with crisp product texture.

EXAMPLE 2

Figure 3:
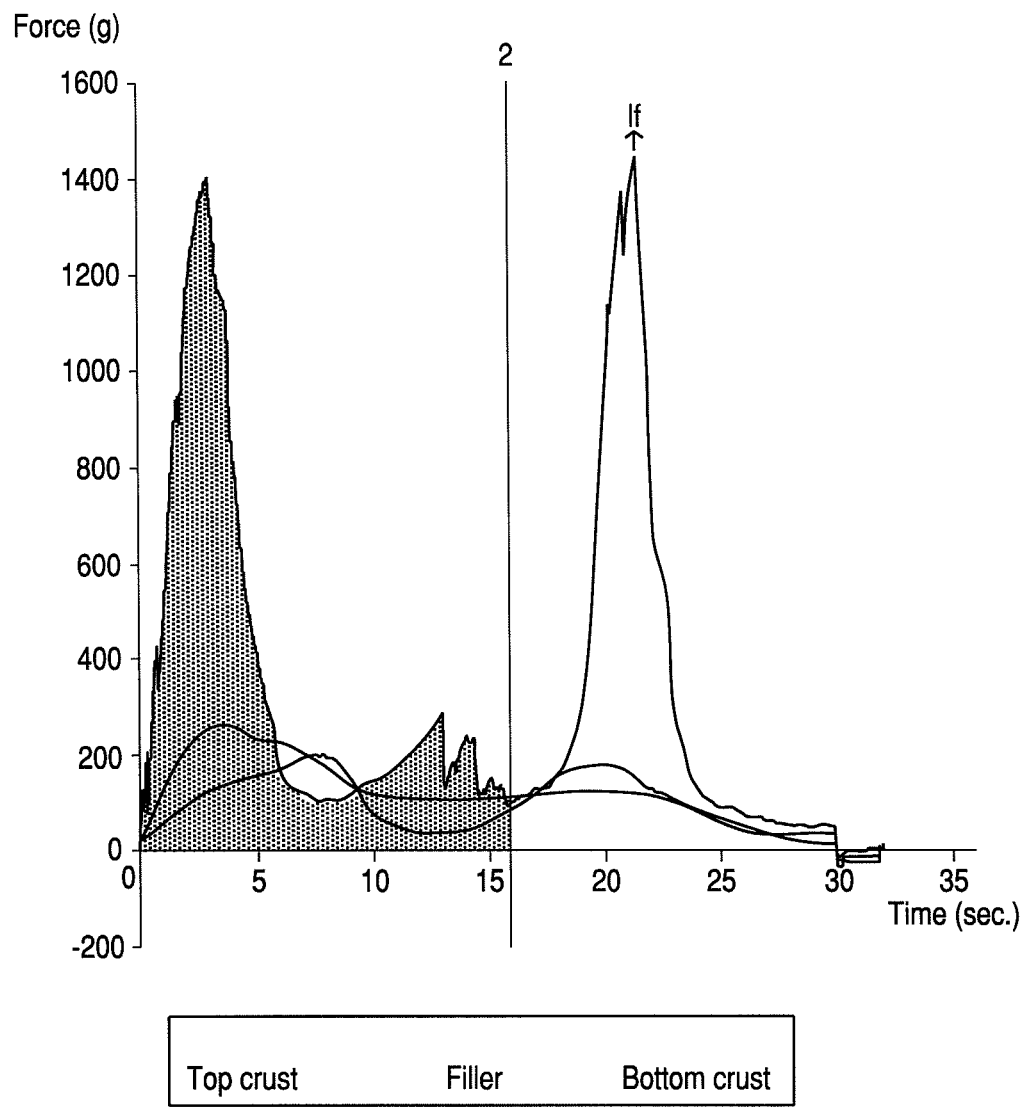
FIG. 3 shows a crispness profile as measured by resistance to deformation, of a filled, baked crispy snack of the present invention.

In this example dough containing pregelatinized waxy corn starch, filled, formed and baked according to Example 1 was analyzed for texture crispness. The texture of an equilibrated product is determined using a texture analyzer (TA-XT2, Texture Technologies Corp/, Scarsdale, N.Y.) equipped with a 25 Kg load cell. The test consisted of puncturing the product with a 2 mm diameter stainless steel probe, while measuring the resistance to deformation, or brittleness (peak force, g). Data is collected using the Texture Expert Exceed software (Texture Technologies Corp., Scarsdale, N.Y.). FIG. 3 shows the crispness profile of finished product. The first peak is sharp and has an unexpectedly high force of about 1431 g demonstrating crispness as the probe punctures the top crust. The probe then passes through the filling which is soft and of low resistance followed by a second sharp peak of about the same unexpectedly high force as the probe punctures through the bottom crust. The crust's sharp, substantial resistance to deformation can be compared with commercial filled product, Fig Newtons® which exhibits a broader peak, low resistance (about 250 g) and Toaster pastry, also exhibiting a broader peak (i.e. soft and deformable) and low resistance (about 190 g). The results are shown in the table below:

| Product | Av. Peak Force (g) +/− S.D. | Moisture (% by weight) | Relative Humidity (%) |
|---|---|---|---|
| Fig Newton ® | 250.52 +/− 14.93 | 14.8 | 67 |
| Toaster Pastry | 190.64 +/− 20.96 | 11.6 | 67 |
| Toaster Pastry | 313.00 +/− 20.00 | 10.6 | 58 |
| Filled Crisp | 1299.71 +/− 148.61 | 8.0 | 48 |
| Filled Crisp | 815.00 +/− 20.00 | 9.4 | 51 |
| Filled Crisp (no pregelatinized waxy starch) | 449.80 +/− 65.32 | 8.8 | 53 |

As demonstrated above and in FIG. 3, product formulated according to the present invention has an unexpectedly greater crispness (higher resistance to deformation, sharp peak) than commercial filled products.

EXAMPLE 3

In this example, fructooligosaccharide may be added to the formula to enhance fiber content. Dough preparation, filling, forming and baking may be performed in the manner described in example 1. Fructooligosaccharide may be added an amount of about 22 lb per 100 lb of flour according to the formula listed below:

| ingredient | totl wt | moist | DWT | Dough |
|---|---|---|---|---|
| Vegetable shortening | 14.18 | 0.20% | 14.15 | 7.32% |
| 62 DE CS | 2.54 | 18.00% | 2.08 | 1.31% |
| sucrose | 9.46 | 0.50% | 9.41 | 4.89% |
| salt | 0.92 | 0.20% | 0.92 | 0.48% |
| ammonium bicarbonate | 0.178 | 99.50% | 0.00 | 0.09% |
| sodium bicarbonate | 0.33 | 50.00% | 0.17 | 0.17% |
| Flavor | 0.53 | 0.20% | 0.53 | 0.27% |
| pregel waxy corn starch | 11 | 0.10% | 10.99 | 5.68% |
| Fructooligosaccaride | 22 | 0.10% | 21.98 | 11.36% |
| Regular Cookie Flour | 100 | 13.00% | 87.00 | 51.64% |
| water | 32.5 | 100.00% | 0.00 | 16.78% |
| protease | 0.31 | | | |
| Total wt- | 193.638 | Dry slds- | 147.23 | |
| Total moisture | 23.97% | | | |

What is claimed is:

1. A filled, baked crispy snack comprising a baked filling having a soft, texture and a moisture content of at least about 10% by weight, based upon the weight of the filling, and a baked casing comprising starch and having a crisp texture, said baked casing having a moisture content of about 6% by weight to about 12% by weight, based upon the weight of the casing, and a glass transition temperature (Tg) of about 75° C. to about 125° C., wherein the enthalpy of the starch in said casing is less than about 6 J/g of starch as measured by differential scanning calorimetry (DSC), the casing has a sugar solids content of less than about 20% by weight, based upon the weight of the casing, the starch in the casing is gelatinized and in a glassy state, and wherein the casing comprises wheat flour and a high Tg ingredient selected from the group consisting of pregelatinized starches, amylopectin, phytoglycogen, extruded starch, pullulan, and dextram, the high Tg ingredient and gelatinized flour starch producing a crisp texture at a baked casing moisture content of about 6% by weight to about 12% by weight.

2. A filled, baked crispy snack as claimed in claim 1 wherein said starch comprises a pregelatinized starch and starch contained in wheat flour, the pregelatinized starch having a degree of gelatinization of at least about 90%.

3. A filled, baked crispy snack as claimed in claim 2 wherein said pregelatinized starch comprises a pregelatinized waxy maize starch.

4. A filled, baked crispy snack as claimed in claim 1 wherein said glass transition temperature (Tg) is at least about 85° C.

5. A filled, baked crispy snack as claimed in claim 1 wherein said glass transition temperature (Tg) is from about 100° C. to about 125° C.

6. A filled, baked crispy snack as claimed in claim 1 wherein said casing is a cracker and said filling is a fruit filling.

7. A filled, baked crispy snack as claimed in claim 1 wherein said casing comprises wheat flour and a pregelatinized starch, the amount of pregelatinized starch being from about 5% by weight to about 30% by weight, based upon the weight of the casing.

8. A filled, baked crispy snack as claimed in claim 1 wherein said casing comprises wheat flour and a pregelatinized starch, the amount of pregelatinized starch being from about 10% by weight to about 25% by weight, based upon the weight of the casing.

9. A filled, baked crispy snack as claimed in claim 1 wherein the moisture content of said casing is from about 7% by weight to about 10% by weight, and the moisture content of said filling is from about 12% by weight to about 25% by weight.

10. A filled, baked crispy snack as claimed in claim 1 wherein said casing comprises wheat flour and a pregelatinized starch, and the enthalpy of the starch in said casing is less than about 5 J/g of starch as measured by differential scanning calorimetry (DSC).

11. A filled, baked crispy snack as claimed in claim 1 wherein the amount of casing is from about 40% by weight to about 60% by weight, based upon the weight of the casing and filling.

12. A filled, baked crispy snack as claimed in claim 1 wherein said filling is visible at opposing ends of the filled, baked crispy snack.

13. A filled, baked crispy snack as claimed in claim 7 wherein said pregelatinized starch is at least about 95% gelatinized.

14. A filled, baked crispy snack as claimed in claim 1 wherein said filling is selected from the group consisting of fruit fillings, vegetable fillings, and cheese fillings.

15. A filled, baked crispy snack as claimed in claim 1 wherein the filling is filled to the edges of the casing.

16. A filled, baked crispy snack as claimed in claim 1 wherein the snack has a resistance to deformation or peak force of at least about 400 g as measured with a texture analyzer having a 2 mm diameter probe.

17. A filled, baked crispy snack as claimed in claim 1 wherein said filling and said casing have about the same relative humidity of less than about 70%, the moisture content of said casing is from about 7 by weight to about 10% by weight, and the moisture content of said filling is from about 12% by weight about 25% by weight.

18. A method for producing a filled, baked crispy snack comprising:
a) admixing ingredients comprising flour and water to form a dough,
b) sheeting the dough into a lower dough sheet and an upper dough sheet,
c) depositing a filling on the lower dough sheet,
d) laminating the upper dough sheet upon the filling and the lower dough sheet to obtain a laminate,
e) cutting the laminate into pieces wherein two opposing ends of the pieces have exposed filling, and
f) baking the pieces to obtain a filled, baked crisp snack with a baked filling having a soft, texture and a moisture content of at least about 10% by weight, based upon the weight of the filling, and a baked casing, said baked casing comprising starch and having a crisp texture, a moisture content of about 6% by weight to about 12% by weight, based upon the weight of the casing, and a glass transition temperature (Tg) of about 75° C. to about 125° C., wherein the enthalpy of the starch in said casing is less than about 6 J/g of starch as measured by differential scanning calorimetry (DSC), the casing has a sugar solids content of less than about 20% by weight, based upon the weight of the casing, the starch in the casing is gelatinized and in a glassy state, and wherein said baked casing comprises wheat flour and a high Tg ingredient selected from the group consisting of pregelatinized starches, amylopectin, phytoglycogen, extruded starch, pullulan, and dextran, the high Tg ingredient and gelatinized flour starch producing a crisp texture at a baked casing moisture content of about 6% by weight to about 12% by weight.

19. A method as claimed in claim 18 wherein said starch comprises a pregelatinized starch and starch contained in wheat flour, the pregelatinized starch having a degree of gelatinization of at least about 90%.

20. A method as claimed in claim 19 wherein said pregelatinized starch comprises a pregelatinized waxy maize starch.

21. A method as claimed in claim 18 wherein said glass transition temperature (Tg) is at least about 85° C.

22. A method as claimed in claim 18 wherein said glass transition temperature (Tg) is from about 100° C. to about 125° C.

23. A method as claimed in claim 21 wherein said baked casing comprises wheat flour and a pregelatinized starch, the amount of pregelatinized starch being from about 5% by weight to about 30% by weight, based upon the weight of said casing.

24. A method as claimed in claim 22 wherein said baked casing comprises wheat flour and a pregelatinized starch, and the enthalpy of the starch in said casing is less than about 5 J/g of starch as measured by differential scanning calorimetry (DSC).

25. A method as claimed in claim 24 wherein the filling is filled to the edges of the casing.

26. A filled, baked crispy snack as claimed in claim 1 wherein said starch comprises a pregelatinized starch and starch contained in wheat flour, the pregelatinized starch being completely gelatinized.

27. A method as claimed in claim 18 wherein said starch comprises a pregelatinized starch and starch contained in wheat flour, the pregelatinized starch being completely gelatinized.

* * * * *